Patented Sept. 13, 1932

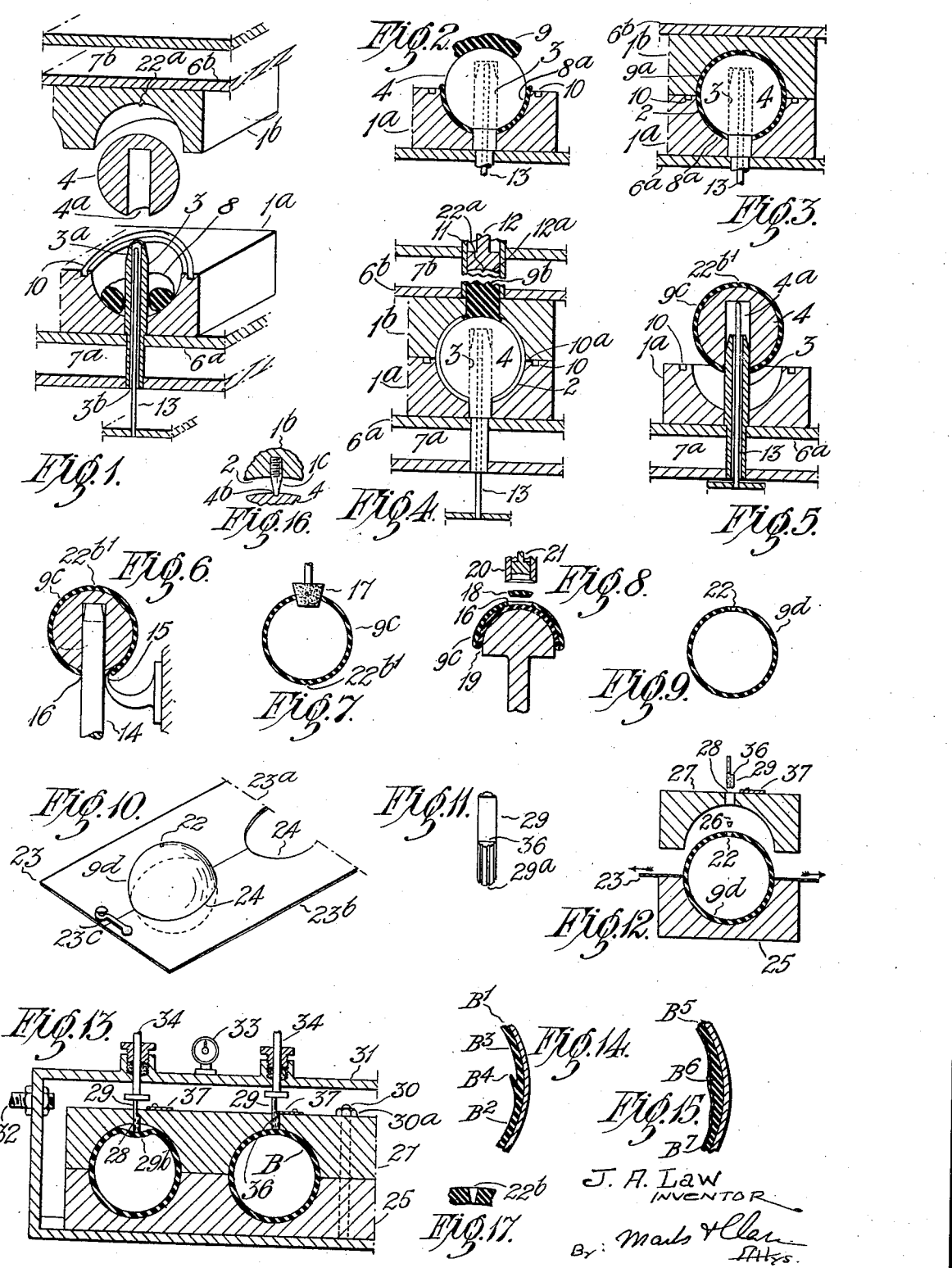

1,877,673

UNITED STATES PATENT OFFICE

JAMES ALLAN LAW, OF ASCOT VALE, VICTORIA, AUSTRALIA

METHOD AND MOLD FOR MOLDING HOLLOW RUBBER ARTICLES

Application filed January 15, 1930, Serial No. 421,013, and in Australia March 6, 1929.

An object of my invention is to produce improved hollow balls suitable for use in playing tennis; and a further object is to enable manufacture to be effected at a low cost. I avoid the production and subsequent combination of rubber elements each constituting half a hollow ball, because such results in an internal ridge which destroys uniformity. I also avoid processes which cause the balls to be uneven in the thickness of the rubber.

By my process and apparatus a ball is made which is free from uneveness and which, awing to its uniformity, will rebound truly and be very durable.

I take rubber material of suitable quality,— in the trade called compound, but hereafter, for brevity, simply termed rubber, and mold it into ball shape on a supported spherical core inside a mold having a spherical cavity, and I partly cure the ball thus made. It then has a hole due to the space occupied by the core support and when I employ a distance piece between the mold top inner surface and the core there will be a small hole caused by it. I remove the partly made ball from the core and if the ball interior should be lined or coated, in any well known manner, with material which will prevent escape of compressed air or gas subsequently admitted, I apply the said lining or coating. Any external web which may occur in making my ball would be thin and would be removed easily by known methods.

I treat the hole edges, and collapse the ball, leaving the hole exposed, and apply a hole filled of the same or virtually the same material as that of the ball. There may be at this stage a relatively small hole in the ball and when air enters through it the ball recovers its normal shape; but if the hole is absent I make one.

I provide a plug by which later on to seal the said hole, but before said sealing I grip the ball in a circular aperture of a register plate, the aperture diameter being slightly smaller than the ball diameter. I then enclose the ball in a spherical chamber in which the ball fits closely.

The register pate is removed to allow the chamber to close. The chamber has a hole which registers with the ball hole, both being conveniently located uppermost when the plate is removed.

Through the chamber hole I extend a plunger for depressing a plug to make the latter close the ball hole. Before actuating said means I place the chamber in a chest to which air or gas under pressure is admitted, and upon the ball becoming charged I depress the means by which the plug is sealed. The ball is deformed by the plunger depression but this is only temporary as when the hole is sealed the plunger is raised. The ball is then ready for completion of the curing, which is effected. My ball is free from all internal projections, is of uniform thickness, and has no joint or seam which, if present, would prevent all parts of the ball having uniform resilience and durability.

The ball could be cured prior to the filling with compressed air or gas, in which case, to press and fix in place any hole filling piece, an electrically heated member is usable.

To understand the foregoing and other features of the invention, reference should be made to the accompanying drawing which illustrates suitable apparatus for carrying my process into effect, except that in practice a plurality of balls would be made simultaneously, and it is not necessary to here illustrate means of mass production.

The construction shown can be varied while retaining any matter hereinafter claimed.

Excepting Figures 10 and 11 all these views are central sections. As suitable forms of press are known in the trade I do not illustrate any.

Figure 1 is a perspective view showing mold and adjacent parts including a core.

Figure 2 is an elevation of a mold lower part, a core, some unmolded rubber, and some molded rubber.

Figure 3 shows the parts in Figure 2, and with the core enclosed by rubber which is enclosed in the mold.

Figure 4 shows an alternative mold containing a core, and rubber positioned for pressure into the molding space.

Figure 5 shows the rubber covered core after the rubber has been partly cured and the mold opened, and said core raised from the mold lower element.

Figure 6 shows the rubber covered core mounted on a handle and held near a hook which is applicable to stretch the hole in the ball and enable removal of the ball from the core.

Figure 7 shows the removed ball, and means to prepare the edge of its hole to receive a hole filling piece.

Figure 8 shows the ball collapsed, with a hole filling piece, and a plunger to press said piece down evenly in correct position so that it fills and closes the hole permanently.

Figure 9 shows the ball with a relatively small hole provided in it to allow of the introduction of compressed air or gas.

Figure 10 is a perspective view of part of a registering plate.

Figure 11 shows—on a larger scale—a sealing pin.

Figure 12 shows a two part box or chamber, its base carrying said registering plate and the ball of Figure 9,—the pin of Figure 11, and a plug to seal the relatively small air hole, being also shown.

Figure 13 shows the parts in Figure 12, with the box closed, the registering plate having been removed, and the box containing the balls enclosed in a casing. The plug fixing pin is shown in two of its positions. The stage shown is that at which compressed air or gas has been supplied in the casing whereby the balls have become filled.

Figure 14 shows a fragment of a known ball having an internal circumferential rib and joint, but in practice frequently the joint is more imperfect by reason of a circular crack existing which leaves the rubber thinner.

Figure 15 shows a fragment of another known ball which is defective because of the irregular thickness of its rubber.

Figure 16 shows—much enlarged—a distance piece as used in some cases to ensure core centralization.

Figure 17 shows—also enlarged—a fragment of a partly made ball having a hole due to the use of said distance piece.

In Figures 14 and 15 I show a textile cover usually applied to tennis balls; and balls made by my process would be so covered.

$B^1$, Figure 14, indicates part of a defective ball made by uniting halves $B^2$, $B^3$, which produce an undesirable flange $B^4$ and frequently an internal circumferential crack. $B^5$, Figure 15, is a ball having irregular thickness at $B^6$. $B^7$ is an air retaining lining.

In the drawing $1^a$, $1^b$ show bottom and top elements of a mold, each having an inner surface of the form of half a sphere. These elements when combined enclose a spherical space 2 in which is centralized a spherical core 4 of smaller diameter.

To hold the core concentrically I provide, extending through mold part $1^a$, a support or peg 3, its ends being shown tapered at $3^a$, the core having peg admission means, represented by a hole $4^a$. An air way is provided in the peg as shown at $3^b$ to let air escape from the mold. The shortest distance from the core to the mold equals the thickness of the rubber of the ball to be made, subject to any slight effect of the further treatment.

Mold elements $1^a$, $1^b$ advantageously in practice adjoin press elements $6^a$, $6^b$, having steam chambers $7^a$, $7^b$, commonly used in this art.

The mold to contain the rubber, which, being plastic, yields to pressure, especially when heated, is heated, and rubber 8 is placed in element $1^a$, see Figure 1, and the spherical core 4,—of metal usually—is depressed on the rubber, the molding surfaces being concentric, the rubber spreading as at $8^a$, any surplus rubber projecting around the mold edge.

Additional rubber 9 is placed on the core, see Figure 2,—and the mold top is depressed on it to spread it as at $9^a$, making it meet and become homogeneous with the lower rubber, and fill the molding space. Any surplus rubber present extrudes into a spew way or channel 10 and can be discarded.

The alternative mold in Figure 4 is apertured to receive rubber $9^b$, and it is convenient to employ in the aperture a tube 11, in which a plunger 12 is worked to cause the plastic uncured rubber to advance and fill the spherical molding space, subject to the presence of a peg 3, surplus rubber extruding through passages $10^a$ into spew way 10

The molding surface $12^a$ of plunger 12 is concave and registers with the mold.

The rubber coating on the core, produced in any way described, is then, in trade language, lightly semi-cured. This partial curing permits of the removal of the ball from the core. The mold is opened and the coated core is removed, suitable means being shown in Figure 5 where 13 is a pusher introduced through the peg; its pressure on the core interior lifts the core relatively to the peg and to the mold lower part. In Figure 6 a holder 14 is shown entered in hole $4^a$ to allow the core and ball to be held conveniently while the latter is separated from the core. Any suitable separating means may be employed; I find that a hook 15 if engaged with ball hole 16 enlarges it sufficiently.

The edge of hole 16 is trued by any obvious means; thus 17 is a grinding tool, and the edges are evened so that they contact closely and unite strongly with a filling piece 18; to be fixed by suitable known means—for example adhesive. To allow of applying the piece 18, the ball 9ᶜ is collapsed and supported on, for example, the convex block 19.

I prefer to press the filling piece edges under those of a tubular holder 20, within which is a plunger 21. Although a heavy metal core will ordinarily when used as described become accurately located for molding, yet I add in some cases a positive locator comprising a distance piece 1ᶜ, Figure 16, projecting from the mold part 1ᵇ into a core recess 4ᵇ, the effect being in addition that the ball will have a small hole 22ᵇ, Figure 17. This hole is useful as hereinafter described. It allows of the admission of air to let the ball resume its spherical shape. If when piece 18 closes the ball there is no hole 22ᵇ, I make a small hole 22, air entering which acts as stated.

In cases in which a hole 22 is to be made, I provide, to indicate the spot 22ᵇ¹ at which to make it, a nipple 22ᵃ in mold 1ᵇ, or on plunger 12.

The ball is charged with compressed air or gas before hole 22 is sealed; then the ball is cured and covered with fabric, if required for playing tennis. Referring to Figures 10 to 13, 23 is a thin register plate having circular holes 24 such that a ball, placed in one of them, is gripped or slightly compressed, it being well to set the ball with its air hole uppermost. This plate is shown in sections 23ᵃ, 23ᵇ connected at 23ᶜ. I locate the ball lower half in the lower part 25 of a chamber in which it fits. I also provide a plug 26, which has a conical point usually, ready to close the said hole the edges of which may be coated with adhesive.

The chamber upper part 27 is then set in place and the register plate removed, so that the chamber is closed. This chamber has a hole 28 registering with ball hole 22. A sealing pin or plunger 29 is fitted in hole 28. It is shown grooved at 29ᵃ for air passage. This pin has plug 26 below it.

The chamber is by suitable means, such as bolts 30 carrying each a nut 30ᵃ, held closed, and is itself enclosed in a chest 31 which is made air-tight, and is charged with air or gas under pressure, 32 being a supply duct and 33 a gauge. When the balls are charged, pin 29 is depressed by for example the pressure of a member 34. This causes a local deformation of the ball shape shown at 29ᵇ, but that deformation disappears when the pressure is relieved.

I lock pin 29, with the plug of the sealed ball B Figure 13, held in position. Thus a catch 37 engages a pin notch 36.

The chest is opened, and the chamber is removed, and curing completed, after which the chamber is opened and the balls taken out.

In the claims which follow the word "ball" means a hollow resilient ball; and the word "rubber" means rubber material or compound such as a person skilled in the art would use, in a state obviously applicable to the stage of the process referred to, it being well known that plastic uncured rubber is used initially, and that it is partly cured at a later stage, and fully cured at a still later stage.

I claim:—

1. A mold for the purpose specified consisting of complementary sections having cavities therein to define a chamber, a peg passable through one section and extending into the chamber, a spherical core having a socket therein removably engaging the peg and serving to maintain the core spaced from the wall of the chamber, said peg having an air escape passage therein, and an ejector extending through the air passage for dislodging the core from the peg.

2. A mold for the purpose specified consisting of complementary sections having cavities therein to define a spherical chamber, a peg carried by one section and extending medially into the chamber, a spherical core having a socket therein receiving the peg, means for permitting air from the chamber to escape through the peg, and means passable through the peg for dislodging the core therefrom.

3. A mold for the purpose specified comprising complementary separable sections having cavities therein defining a chamber, a peg carried by one section and extending into the chamber, the other section having an aperture therein, a core removably engaged on the peg and maintained through the medium of the peg spaced from the wall of the chamber, and a plunger for forcing the material to be molded through the aperture into the chamber.

4. A method of forming hollow rubber balls which consists in forming minute holes in the balls, placing the balls in chambers, then placing the chambers in a chest, supplying the chest with fluid under pressure to enter the balls through the holes, and using pins for forcing closure plugs into the holes.

5. A mold for forming hollow rubber articles comprising complementary sections having concavities therein defining a chamber, a core in the chamber, means extended into the chamber for engaging the core, a distance piece carried by one section and engaged with the core and cooperating with said means to hold the core centralized in the chamber.

6. A mold as claimed in claim 5 wherein the distance piece forms a hole in the article being molded on the core.

7. A method for molding hollow rubber balls which consists in placing the material on a core in a mold chamber, forming a minute hole and a main hole in the ball, partly curing the material when in the mold, then removing the core and ball from the mold, then drawing the core through the main hole, then plugging the main hole and forcing air under pressure into the ball through the minute hole, and then completing the curing of the ball.

In witness whereof I have hereunto signed my name to this specification at Melbourne in the State of Victoria, in Australia, this eighteenth day of December, 1929.

JAMES ALLAN LAW.